United States Patent
Verma et al.

(10) Patent No.: US 7,636,946 B2
(45) Date of Patent: Dec. 22, 2009

(54) UNWANTED FILE MODIFICATION AND TRANSACTIONS

(75) Inventors: Surendra Verma, Bellevue, WA (US); Dana D. Groff, Sammamish, WA (US); Jonathan M. Cargille, Seattle, WA (US); Andrew M. Herron, Redmond, WA (US); Christian G. Allred, Snohomish, WA (US); Neal R. Christiansen, Bellevue, WA (US); Alexey A. Polyakov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 11/377,713

(22) Filed: Mar. 15, 2006

(65) Prior Publication Data
US 2007/0180530 A1    Aug. 2, 2007

Related U.S. Application Data

(60) Provisional application No. 60/713,624, filed on Aug. 31, 2005.

(51) Int. Cl.
*G06F 12/14* (2006.01)
*G06F 17/30* (2006.01)

(52) U.S. Cl. .............. 726/24; 707/10; 707/104.1; 707/204; 713/188; 714/100; 726/25

(58) Field of Classification Search ............. None
See application file for complete search history.

(56) References Cited

U.S. PATENT DOCUMENTS

| | | | | |
|---|---|---|---|---|
| 5,712,971 | A * | 1/1998 | Stanfill et al. | 714/34 |
| 6,981,104 | B2 * | 12/2005 | Prabhu | 711/144 |
| 7,103,597 | B2 * | 9/2006 | McGoveran | 707/8 |
| 7,188,368 | B2 * | 3/2007 | Swimmer et al. | 726/24 |
| 7,290,166 | B2 * | 10/2007 | Rothman et al. | 714/6 |
| 2005/0050338 | A1 * | 3/2005 | Liang et al. | 713/188 |
| 2006/0021032 | A1 * | 1/2006 | Challener et al. | 726/22 |
| 2006/0092035 | A1 * | 5/2006 | Abali et al. | 340/686.1 |
| 2006/0294589 | A1 * | 12/2006 | Achanta et al. | 726/24 |

* cited by examiner

*Primary Examiner*—Greta L Robinson
*Assistant Examiner*—James J Wilcox
(74) *Attorney, Agent, or Firm*—Workman Nydegger

(57) ABSTRACT

Aspects of the subject matter described herein relate to antivirus protection and transactions. In aspects, a filter detects that a file is participating in a transaction and then may cause the file to be scanned together with any changes that have made to the file during the transaction. After a file is scanned, a cache entry may be updated to indicate that the file is clean. The cache entry may be used subsequently for like-type states. For example, if the file was scanned inside a transaction, the cache entry may be used later in the transaction. If the file was scanned outside a transaction, the cache entry may be used later for requests pertaining to files not in a transaction. Cache entries may be discarded when they are invalid or no longer useful.

17 Claims, 8 Drawing Sheets

UNWANTED FILE MODIFICATION AND TRANSACTIONS

CROSS REFERENCE TO RELATED APPLICATION

This application claims the benefit of U.S. Provisional Application No. 60/713,624, filed Aug. 31, 2005, entitled GUARDING AGAINST UNWANTED FILE MODIFICATION WITH TRANSACTIONS, which application is incorporated herein in its entirety.

BACKGROUND

Computer security threats are becoming an almost everyday occurrence. Often vulnerabilities are discovered by computer hackers who then create a computer virus (hereinafter "virus") to exploit the vulnerability. The viruses may cause unwanted file modifications to files in a file system. Some viruses may cause little or no damage while others may cause tremendous damage in information loss, productivity disruption, repair and reconfiguration efforts, and otherwise. Viruses may rapidly spread from one computer to another and may quickly cause damage on infected computers.

SUMMARY

Briefly, aspects of the subject matter described herein relate to antivirus protection and transactions. In aspects, a file system filter detects that a file is participating in a transaction and then may cause the file to be scanned together with any changes that have been made to the file during the transaction. After a file is scanned, a cache entry may be updated to indicate that the file is clean. The cache entry may be used subsequently for like-type states. For example, if the file was scanned inside a transaction, the cache entry may be used later in the transaction. If the file was scanned outside a transaction, the cache entry may be used later for requests pertaining to files not in a transaction. Cache entries may be discarded when they are invalid or no longer useful.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

DETAILED DESCRIPTION

Exemplary Operating Environment

Figure 1:
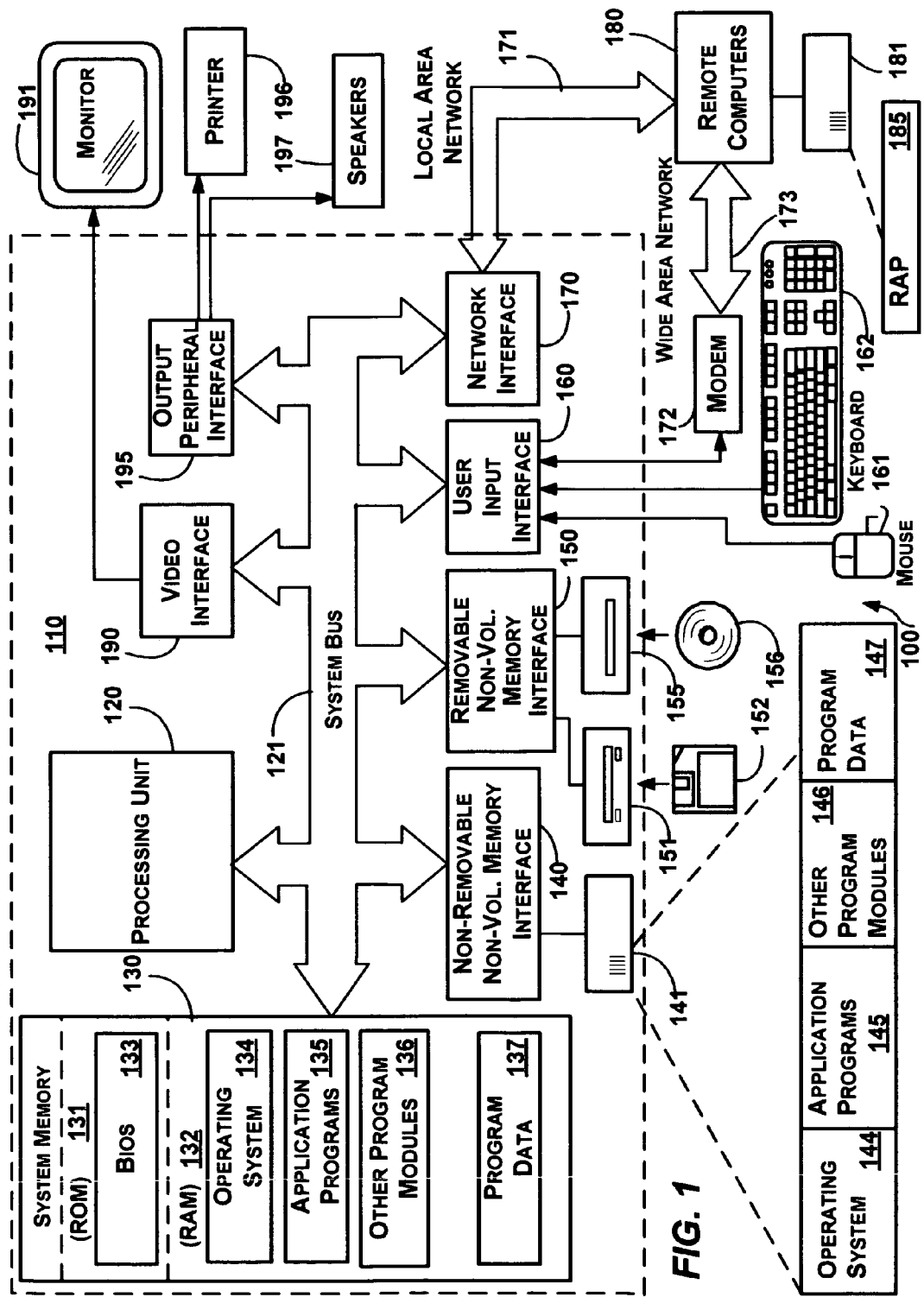
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like. A device capable of executing instructions (such as one of the above devices) is sometimes referred to as a machine.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Filters and Operation Thereof

With contemporary operating systems, such as Microsoft Corporation's Windows® XP operating system with an underlying file system such as the Windows® NTFS (Windows® NT File System), FAT, CDFS, SMB redirector file system, or WebDav file systems, one or more file system filter drivers may be inserted between the I/O manager that receives user I/O requests and the file system driver.

In general, filter drivers (sometimes referred to herein simply as "filters") are processes or components that enhance the underlying file system by performing various file-related computing tasks that users desire, including tasks such as passing file system I/O (requests and data) through antivirus software, file system quota providers, file replicators, encryption/compression products, and the like.

For example, antivirus products may provide a filter that watches I/O to and from certain file types (.exe, .doc, and the like) looking for virus signatures, while file replication products may perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, and removal of the components without changing the actual operating system or file system driver code.

Figure 2:
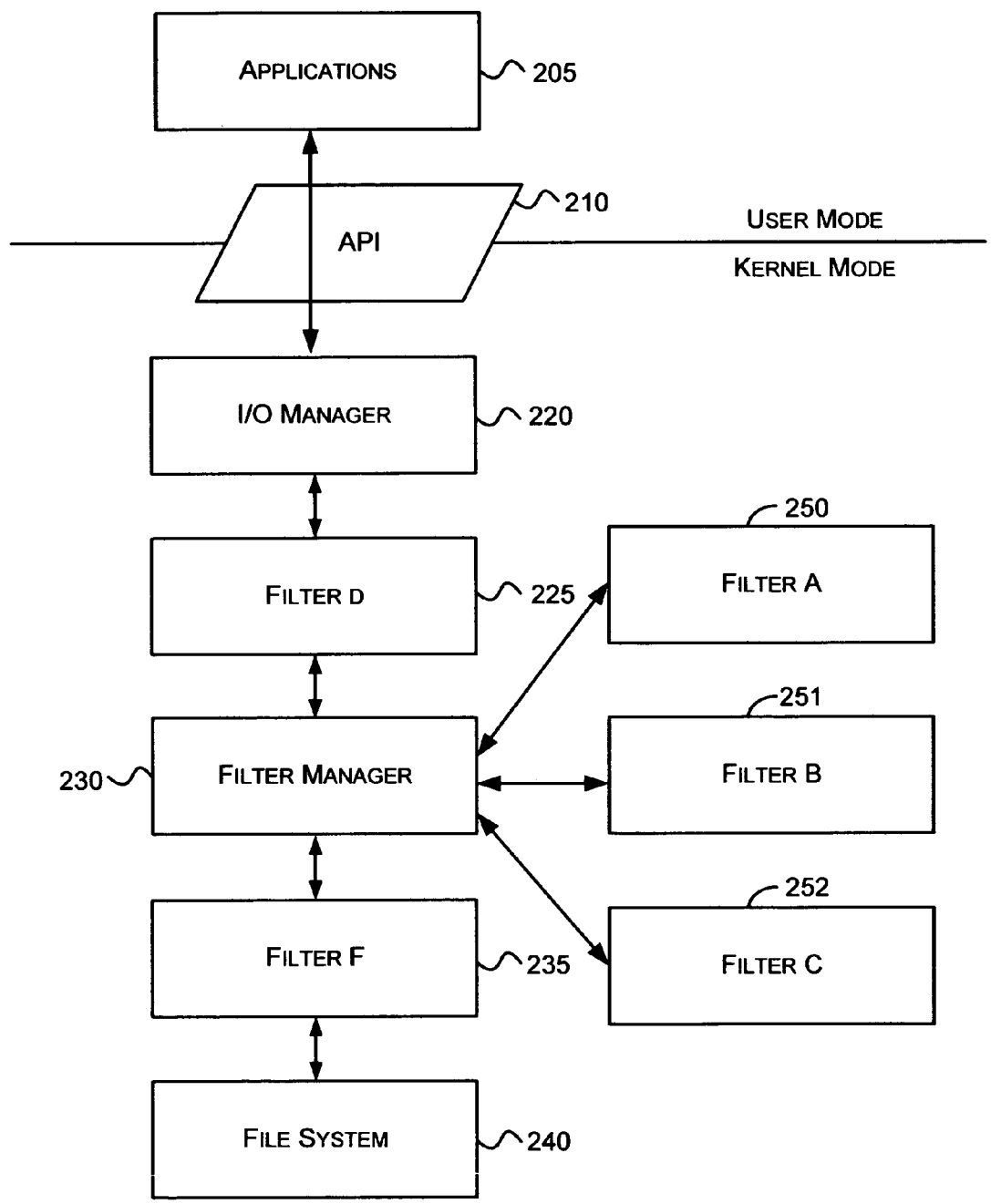
FIG. 2 is a block diagram representing an exemplary arrangement of components of a system in which aspects of the subject matter described herein may operate.

FIG. 2 is a block diagram representing an exemplary arrangement of components of a system in which aspects of the subject matter described herein may operate. The components include one or more applications 205, an applications programming interface (API) 210, an input/output (I/O) manager 220, a filter manger 230, a file system 240, and one or more filters 225, 235, and 250-252. In this configuration, some filters are associated with a filter manager while other filters are not. The filter manager 230 is placed in a stack with other filters (e.g., filters 225 and 235).

The applications 205 may make file system requests (e.g., via function/method calls) through the API 210 to the I/O manager 220. The I/O manager 220 may determine what I/O request or requests should be issued to fulfill each request and send each I/O request to the filter manager 230. The I/O manager 220 may also return data to the applications 205 as operations associated with the file system requests proceed, complete, or abort.

In one implementation, some filters comprise objects or the like that when instantiated register (e.g., during their initialization procedure) with a registration mechanism in the filter manager 230. Such filters are sometimes referred to as managed filters. For efficiency, each filter typically will only register for file system requests in which it may be interested in processing. To this end, as part of registration, each filter notifies the filter manager 230 of the types of I/O requests in which it is interested (e.g., create, read, write, cleanup, close, rename, set information, query information, and so forth). For example, an encryption filter may register for read and write I/Os, but not for others wherein data does not need to be encrypted or decrypted.

In addition to specifying the types of I/O requests in which it is interested, a filter may further specify whether the filter should be notified for pre-callbacks and post callbacks for each of the types of I/O. A pre-callback is called as data associated with an I/O request propagates from the I/O manager 220 towards the file system 240, while a post-callback is called during the completion of the I/O request as data associated with the I/O request propagates from the file system 240 towards the I/O manager 220.

From each I/O request, the filter manager 230 may create a data structure in a uniform format suitable for use by the filters 250-252. Hereinafter, this data structure is sometimes referred to as callback data. The filter manager 230 may then call and pass the callback data (or a reference thereto) to each filter that has registered to receive callbacks for the type of I/O received by the filter manager 230. Any filters registered to receive callbacks for the type of I/Os received by the filter manager 230 are sometimes referred to as registered filters.

Typically, the filter manager 230 passes callback data associated with a particular type of I/O request to each registered filter sequentially in an order in which the registered filters are ordered. For example, if the filters 250 and 252 are registered to receive callbacks for all read I/O requests and are ordered such that the filter 250 is before the filter 252 in processing such requests, then after receiving a read I/O, the filter manager 230 may first call and pass the callback data to the filter 250 and after the filter 250 has processed the callback data, the filter manager 230 may then call and pass the callback data (as modified, if at all) to the filter 252.

A filter may be attached to one or more volumes. That is, a filter may be registered to be called and receive callback data for I/Os related to only one or more than one volumes.

A filter may generate its own I/O request which may then be passed to other filters. For example, an antivirus filter may wish to read a file before it is opened. A filter may stop an I/O request from propagating further and may instruct the filter manager to report a status code (e.g., success or failure) for the I/O request. A filter may store data in memory and persist this data on disk. In general, a filter may be created to perform any set of actions that may be performed by a kernel-mode or user-mode process and may be reactive (e.g., wait until it receives I/O requests before acting) and/or proactive (e.g., initiate its own I/O requests or perform other actions asynchronously with I/O requests handled by the I/O manager 220).

As described above, filter manager 230 may be placed in a stack with other filters (e.g., filters 225 and 235). Each of the filters 225 and 235 (sometimes referred to as stacked filters) may process I/O requests and pass the requests (modified or unmodified) to another filter or other component in the stack. For example, in response to a read request received from one of the applications 205, the I/O manager 220 may issue an I/O request and send this request to the filter 225. The filter 225 may examine the I/O request and determine that the filter 225 is not interested in the I/O request and then pass the I/O request unchanged to the filter manager 230. If any of the filter manager 230's registered filters are interested in the I/O, the filter manager 230 may pass callback data to the interested filters. After any interested registered filters have had an opportunity to examine and act on the callback data, the filter manager 230 may pass the I/O request (changed or unchanged) to the filter 235. The filter 235 may determine that the filter 235 will perform some action based on the I/O request and may then pass the I/O request (changed or unchanged) to the file system 240.

After the file system 240 services the I/O request, it passes the results to the filter 235. Typically, the results pass in an order reverse from that in which the I/O request proceeded (e.g., first to filter 235, then to filter manager 230 which may send callback data to each of its interested register filters, and then to filter 225). Each of the filters (managed and unmanaged) may examine the results, determine whether the filter is interested in the results, and may perform actions based thereon before passing the results (changed or unchanged) on to another filter or component.

It will be readily recognized that filters may be implemented in many other configurations without departing from the spirit or scope of the subject matter described herein. For example, in some embodiments the only filters existing in a system may be the filter manager 230 and its managed filters. In other embodiments, the only filters existing in a system may be the stacked filters. In stacked/managed configurations, the ordering of the filter manager and other filters and the number of filters may vary from that shown in FIG. 2.

In some embodiments, a filter comprises any object that examines I/O between an application and a file system and that is capable of changing, completing, or aborting the I/O or performing other actions based thereon. Such filters may execute in user mode or in kernel mode and may be part of other components. In embodiments, other components described herein may execute in user mode or in kernel mode and may also be part of other components.

Antivirus Support in Transactions

Transactions pose a particular challenge to antivirus software. Using the characteristics of transactions, a virus writer may create a virus that may avoid detection unless proper steps are taken by the antivirus software. In one embodiment, a transaction is a group of operations that have the following properties: atomic, consistent, isolated, and durable. In other embodiments, a transaction may comprise a group of operations with one or more of the above properties.

Atomic indicates that either every operation in the group succeeds, or the tangible effects (e.g., file changes) of the operations in the group are undone (also known as rolled back). For example, a bank transfer may be implemented as an atomic set of two operations: a debit from one account and a credit to another account. If the two operations do not both succeed, then the transfer is either unfairly in favor of the bank or the account holder. Thus, either both should succeed in a transaction or the tangible effects (e.g., data stored to disk or memory) of any that did succeed should be undone.

Consistent means that if the data is consistent before the transaction begins, then it will be consistent after the transaction finishes. In the bank transfer example above, consistency may be defined as having the combined account balance of the two accounts be a constant. To implement consistency in the bank transfer example, the debit and credit operations simply need to be for the same amount of money and either both be completed or neither completed on each account.

Isolated means that the work done within a transaction that is in progress cannot be seen by threads or processes performing work associated with other transactions or outside the transaction. For example, in an update, an electronic commerce site may need to have a new product category navigation page appear at the same time as the product detail pages that describe the new products. If the navigation page appeared before the product detail pages, this might cause missing pages for a customer who is currently shopping using the navigation page. Having the navigation page and the product detail pages appear at the same time may be implemented by updating and adding multiple files and directory entries under the control of a transaction.

Isolation also applies to read operations. Files opened within a transaction for reading will not see changes made by operations outside of the specific transactions. (Files may be modified by other transactions or outside any transaction.)

Durability means that after an update is finished, its effects persist even if the system stops responding (e.g., because of a power outage). In the electronic commerce site example, durability can be provided by writing the updates to non-volatile storage such as a hard disk. Durability may also involve a system with non-volatile memory, data backup, recovery, and high availability mechanisms.

Figure 4:
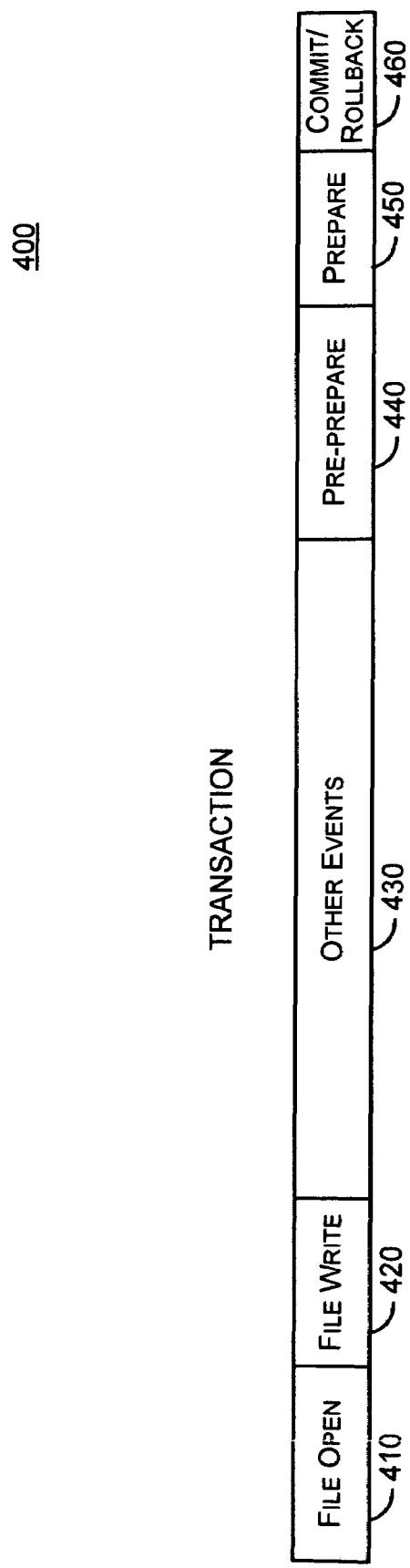
FIG. 4 is a block diagram that generally represents actions and states that may occur within a transaction in accordance with aspects of the subject matter described herein.

FIG. 4 is a block diagram that generally represents actions and states that may occur within a transaction 400 in accordance with aspects of the subject matter described herein. The transaction 400 may include one or more of a file open 410, a file write 420, an other events state 430, a pre-prepare state 440, prepare state 450, and commit/rollback state 460.

During the file open 410 a file is opened as part of a transaction. In one embodiment, this may be done with a transacted file handle. It will be recognized, however, that other mechanisms may be used for opening a file as part of a transaction, and that such mechanisms may be used without departing from the spirit or scope of the subject matter described herein.

After the file has been opened as part of a transaction, the file may be scanned for viruses as described below in conjunction with FIG. 3. Scanning the file within the transaction with a transacted file handle allows detection of changes made to the file by other file handles within the transaction. Scanning the file outside of the transaction may isolate the scanning from the changes made within the transaction. Note, a file may be opened and closed multiple times within a transaction.

When a scanner scans a file and determines that the file does not contain viruses, the scanner may update a cache entry of a cache. If the file is opened again, this cache entry may be used to determine that the file does not need to be scanned again. If a cache entry is invalid or does not exist for a file, the scanner may scan the file in response to a request to determine whether the file is free of viruses. A cache entry may be deleted or invalidated as described below. Data contained in a cache entry is also described in more detail below.

During the file write 420, writes occur to a file. File metadata regarding the file may be changed to indicate a last modified time. Writing to a file may cause a filter as described below to invalidate (or delete) a cache entry associated with the file so that the next time the file is opened or before committing the transaction, the file is scanned again.

During the other events state 430, other transaction events and/or file operations may occur. In one embodiment, one or more save points or mini-versions (described below) may be created within a file during the other events state 430.

In the prepare state 450, each of the components that has enlisted in the transaction completes all actions associated with the transaction that could fail (e.g., allocating memory, writing to disk, and the like) and once complete, votes with the transaction manager that the transaction should be rolled back or committed. In one embodiment, if one participant in a transaction votes for a rollback, all the transaction work is rolled back.

During the commit/rollback state 460, either the changes are completed for a commit, writing anything to disk that had not be written in the prepare phase, or for rollback any change that was written is undone. The last three states 440-460 may be performed sequentially. The other states may be performed in any order and may be repeated any number of times during a transaction.

If an antivirus product is unaware that a file is involved in a transaction, the antivirus product may incorrectly determine that the file does not contain a virus. For example, the isolation property described above indicates that changes done to a file within a transaction may not be seen by threads outside the transaction. If a virus changes a file within a transaction and the antivirus product scans the file outside the transaction but before the changes are committed, the antivirus product may not see the changes caused by the virus until the changes commit. If the antivirus product further caches that the file is clean, the antivirus product may forgo scanning the file before a subsequent activity (e.g., execution). Such subsequent execution may wreak havoc on the computer system if the file is in fact infected with a virus.

Those skilled in the art will recognize that many other attacks may be designed to take advantage of the nature of file systems that have transaction support. Aspects of the subject matter described herein are designed to defend against these attacks.

Figure 3:
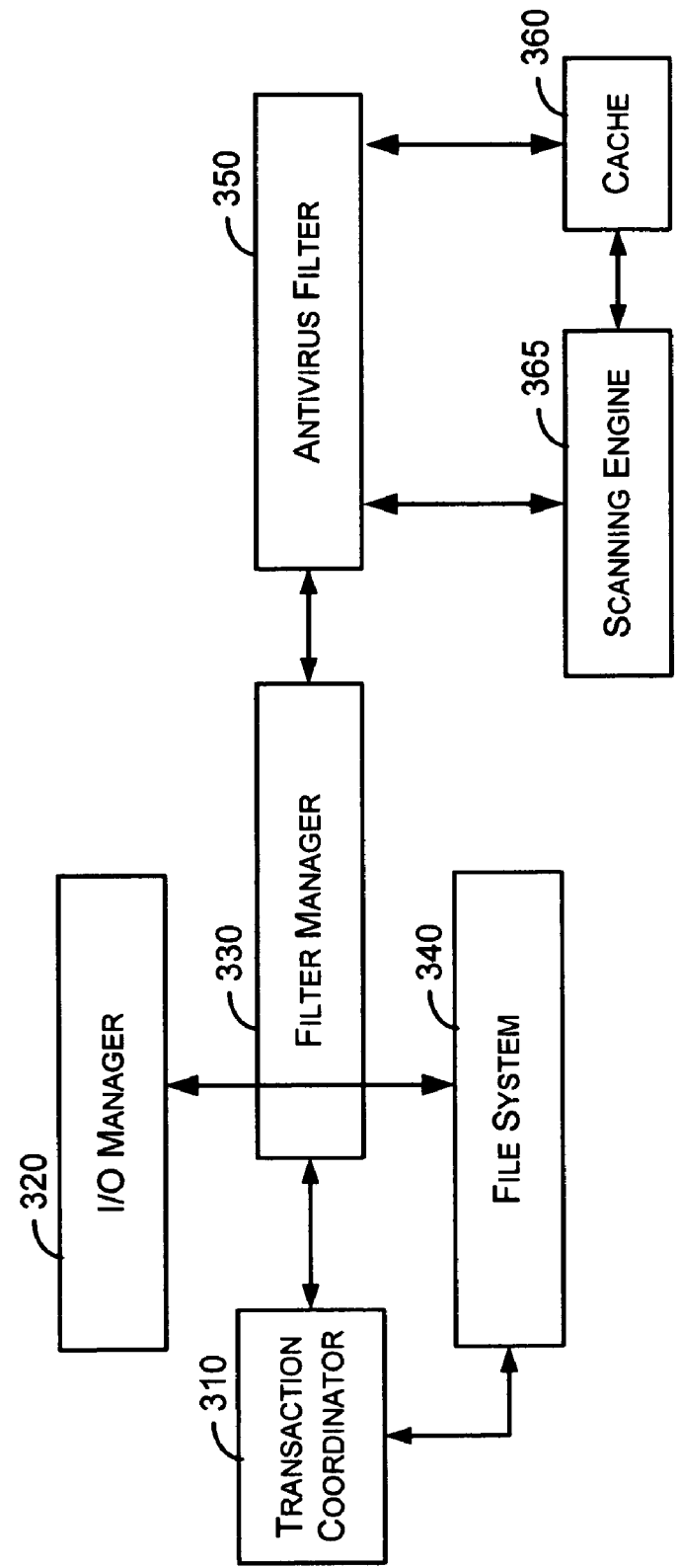
FIG. 3 is a block diagram that generally represents some components that may be used in implementing aspects of the subject matter described herein.

FIG. 3 is a block diagram that generally represents some components that may be used in implementing aspects of the subject matter described herein. The components include an I/O manager 320, a file system 340, a transaction coordinator 310, a filter manager 330, an antivirus filter 350, its cache 360, and a scanning engine 365. These components (e.g., 330, 350, 360, 365), may include functionality that reside within one piece of software or may be made up of separate pieces of software that are arranged to work together. The filter manager 330 and the antivirus filter 350 may include the functionality described in conjunction with FIG. 2 and may also include functionality for dealing with transactions involving the file system 340.

Although not shown, other filters may also be placed in the filter stack and/or managed by the filter manager 330 without departing from the spirit or scope of the subject matter described herein.

The transaction coordinator 310 may comprise a component that provides notification of transaction events to registered components, makes transactions available as objects, and provides transaction management services to other components.

A component that uses the transaction coordinator 310 may decide the granularity with which it uses transactions. For example, a process may use a transaction to coordinate the work of updating one or more files but may determine not to use a transaction to update other files. In other words, an application may be designed so that it controls when it accesses a file using a transaction and when it does not.

In one implementation, the filter manager 330 may comprise a transactional resource manager that registers with a transaction coordinator. As a transactional resource manager, the filter manager 330 may enlist in transactions associated with file operations.

Using the transaction coordinator 310 and the I/O manager 320, the filter manager 330 may provide functionality related to transactions to any filters the filter manager 330 manages (e.g., the antivirus filter 350). For example, the filter manager 330 may indicate whether or not a file operation (e.g., open, create, write, close, and the like) is related to a file that is within a transaction. The filter manager 330 may also provide an interface that allows the antivirus filter 350 to obtain or create a handle by which the antivirus filter 350 or scanning engine 365 may examine a file within a transaction. Within a transaction, in this sense, means that the antivirus filter 350 or scanning engine 365 may read the file with any changes that have been made during the transaction, even though the transaction has not committed.

To determine if a modification will inject a virus, the antivirus filter 350 may determine that the file is within a transaction (as described below), request a handle to read the file within the transaction, and scan the file within the transaction in its currently modified state. If the modification will introduce a virus, the antivirus filter 350 may rollback the transaction.

Alternatively, the antivirus filter 350 may determine whether a file has a virus during open and may cache this result. If the antivirus filter 350 later determines that the file has been written to it may invalidate or delete the cache entry as described below.

In one implementation, a file may be bound to a transaction upon an open operation of the file. An object associated with I/O related to a file may include a transaction ID that indicates that the file is or is not involved in a transaction as described below.

When a file operation is received at the filter manager 330, the filter manager 330 may pass a pointer to an object (e.g., named Related_Objects) to the antivirus filter 350.

As exemplary fields, the Related_Objects object may include a volume ID, an instance ID, a file object ID, a transaction ID, transaction context information such as a mini-version, and other fields that indicate objects related to a file operation. The instance ID may identify an instance of the filter, while the volume ID may identify the volume associated with the file operation. The file object may reference or include data regarding the file operation.

The transaction ID may be assigned NULL if the file operation involves a file that is not in a transaction. If the transaction ID is not NULL, this may indicate that the file operation involves a file that is in a transaction. Furthermore, when not NULL, the transaction ID may be used to set or find a transaction context object which may include filter specific information associated with the transaction.

A transaction context object may be associated with a transaction ID through APIs (sometimes referred to simply as interfaces) provided by the filter manager 330 that allows the object to be read from, written to, allocated, and deleted. The antivirus filter 350 may store any type of data desired in the transaction context object. In one implementation, memory for the transaction context object associated with the antivirus filter 350 may be allocated when the antivirus filter 350 registers with the filter manager 330. Afterwards, upon demand, the antivirus filter 350 may request the memory reserved for transaction context objects be associated with a particular transaction ID. In another implementation, the memory for the transaction context object may be allocated at any time. After the transaction commits or rolls back, the filter manager 330 may automatically reclaim all memory for transaction context objects associated with the transaction. In doing so, the filter manager 330 may also call a specified callback of the antivirus filter 350 so that the antivirus filter 350 may also perform various actions before the memory is reclaimed.

It should be recognized that a filter may be attached more than one time to the filter manager. Thus, in referencing memory associated with a transaction context object, a filter may need to pass a transaction ID and an instance ID.

A miniversion may be used within a transaction to allow reading a previous state of files involved in the transaction (without rolling back the transaction). There may be many miniversions associated with a file within a transaction that allow reading of various states of the file at different times throughout the transaction. In addition, a transaction may involve one or more save points. A save point allows all the files involved in a transaction to be rolled back to the state that existed when the save point was created (without rolling back an entire transaction). This may be useful, for example, if a routine called during a transaction makes changes to files involved in the transaction but fails. By restoring to a save point created just before the routine was called, any changes made by the routine may be reversed.

In one embodiment, to assist in defending against viruses, a save point may be created successfully only if all files associated with the transaction are currently closed.

In one embodiment, the filter manager 330 may extract the information it uses to build a Related_Objects object from a file object that the I/O manager indicates is associated with a file operation.

When the antivirus filter 350 receives the Related_Objects object, the antivirus filter 350 may decide whether or not the antivirus filter 350 is interested in the transaction. If the antivirus filter 350 is interested in the transaction, the antivirus filter 350 may enlist to receive information regarding subsequent transaction events involving the file. In one embodiment, the antivirus filter 350 may enlist to receive information regarding transaction events when it receives an open I/O related to a file. In another embodiment, the antivirus filter 350 may enlist to receive information regarding transaction events any time during the transaction.

In enlisting to receive information regarding a transaction, a filter may request a callback (e.g., that a specified procedure or method is called) whenever a transaction event in which the filter is interested occurs. Some exemplary transaction events include commit, rollback, prepare to commit, pre-prepare to commit, save point create, save point rollback, and so forth. Upon enlistment, the filter manager 330 may create an enlistment structure that associates transactions with filters. This structure may then be used to provide callbacks to the appropriate filters.

When the filter manager 330 receives an event related to a transaction in which the antivirus filter 350 has enlisted, the filter manager 330 may call back the transaction callback of the antivirus filter 350 and pass a pointer to the Related_Objects object. The filter manager 330 may also pass a parameter (e.g., a bit mask) that indicates which type of transaction event has occurred. After receiving a callback that a transaction event has occurred, the antivirus filter 350 may perform any actions it desires as appropriate (including scanning files and requesting that the transaction be rolled back). After it finishes performing the actions, the antivirus filter 350 may then indicate completion (e.g., success or failure) to the filter manager 330. In response, the filter manager 330 may indicate to the transaction coordinator 310 that the transaction may complete successfully or rollback.

Scanning and Caching

The antivirus filter 350 may be associated with a scanning engine 365 and a cache 360. In one embodiment, the cache 360 may comprise a data structure that is part of the scanning engine 365. In another embodiment, the cache 360 may comprise an object separate from the scanning engine 365. In either embodiment, data in the cache 360 may or may not persist across separate executions of the antivirus filter 350.

The antivirus filter 350 may inform the scanning engine 365 what files the scanning engine 365 is to scan for viruses. If the file is not within a transaction, the antivirus filter 350 may pass the scanning engine 365 a handle or other identifier that allows the file to be read outside of a transaction. If the file is within a transaction, the antivirus filter 350 may pass the scanning engine 365 a handle or enough information that allows the scanning engine 365 to create a handle that allows the file to be read within the transaction. If the scanning engine 365 determines that the file is infected, it may inform the antivirus filter 350. If the scanning engine 365 determines that a file is not infected, it (or the antivirus filter 350) may store information in the cache 360 accordingly so that subsequent scans of the file may be avoided. For example, when a file is within a transaction, a file object ID, transaction ID, and optionally any associated information such as a miniversion and/or save point ID may be stored in the cache 360.

Scanning may be thought of as scans performed outside of transactions and scans performed inside transactions. When a file is opened outside a transaction (and is not concurrently open within a transaction), scanning may be performed during an open operation before the open operation is allowed to succeed. The phrase "open operation" should be read to include open, create, and/or execute operations involving the file. If the cache 360 indicates that the file is clean, repeat scanning may not be performed for other open operations involving the file until the cache 360 no longer indicates that the file is clean. If the file is modified, any cache entry associated with the file may be discarded or invalidated. Then, when the file is opened again, scanning may occur again (since the cache entry was discarded).

When the file is opened inside a transaction (and is or is not concurrently open outside the transaction), scanning may be performed during open operations and during the prepare stage before a commit if the file has been changed during the transaction. During the prepare stage, the file is scanned after it is known that no more changes will occur during the transaction but before the transaction commits. If the cache 360 indicates that the file is clean, scanning may not be performed during the first open operation of the file within the transaction but may be performed during subsequent open operations of the file within the transaction as a file may be opened, modified, and closed more than once during a transaction.

During transactions, if a file has not been previously scanned (as indicated by the cache 360), scanning may first occur when the antivirus filter 350 sees an open operation. If the file is subsequently closed and then reopened, scanning occurs again unless the transaction context for the file (e.g., any combination or permutation of file object ID, transaction ID, and save point ID and miniversion, if any) matches a valid entry in the cache 360. Matching a valid entry in the cache 360 means that the cache 360 includes an entry that indicates that scanning has occurred for a file having a file object ID, transaction ID, save point ID (if any), and miniversion (if any) of the file in the transaction. In one embodiment, a match may occur even if the save point (if any) identified in the cache is less than the current save point of the file. If no such valid entry exists, scanning may occur before the open operation is allowed to succeed. If such scanning indicates that the file contains no viruses, then an entry including the transaction context may be added to the cache 360 to indicate that the file with this transaction context is clean.

If the scanning engine 365 detects a virus during an open operation, the operation may be failed. If the file is also participating in a transaction, the antivirus filter 350 may request that the transaction be rolled back. If the scanning engine 365 does not detect a virus at this point, the open operation may be allowed to succeed.

Entries in the cache 360 may be discarded at certain times and at other times kept and/or modified. For example, if a file was scanned during the transaction, the file was not modified since the scanning, and the transaction commits, a cache entry that was added for the scanning may not be discarded. In some embodiments, however, the cache entry may be modified to indicate that it applies to the file even outside the transaction. This may be done, for example, by setting the transaction ID of the cache entry equal to NULL upon commit.

As another example, after a transaction has committed, any cache entries that include a miniversion and/or save point may be discarded.

Entries for any files involved in a specific transaction in the cache 360 that existed prior to the transaction starting may not be discarded if the transaction rolls back as the roll back brings the files back to the state they were in before the transaction occurred. If the transaction completes successfully, however, those same entries for files involved in the transaction may be deleted or replaced with more up-to-date entries that occurred during the transaction. Entries that existed for files that did not change during the transaction may not be deleted.

If a file was scanned during the transaction and the transaction rolls back, any cache entry created for the file during the scanning may be discarded.

If a transaction is rolled back to a save point, any cache entries associated with save points later than the save point to which it was rolled back may be discarded.

Files may be quarantined and copied or moved to a quarantine directory using a transaction that isolates this work from detection until the transaction is committed. This may thwart virus attacks that examine the quarantine directory and attempt to infect or replace files found therein.

Figure 5:
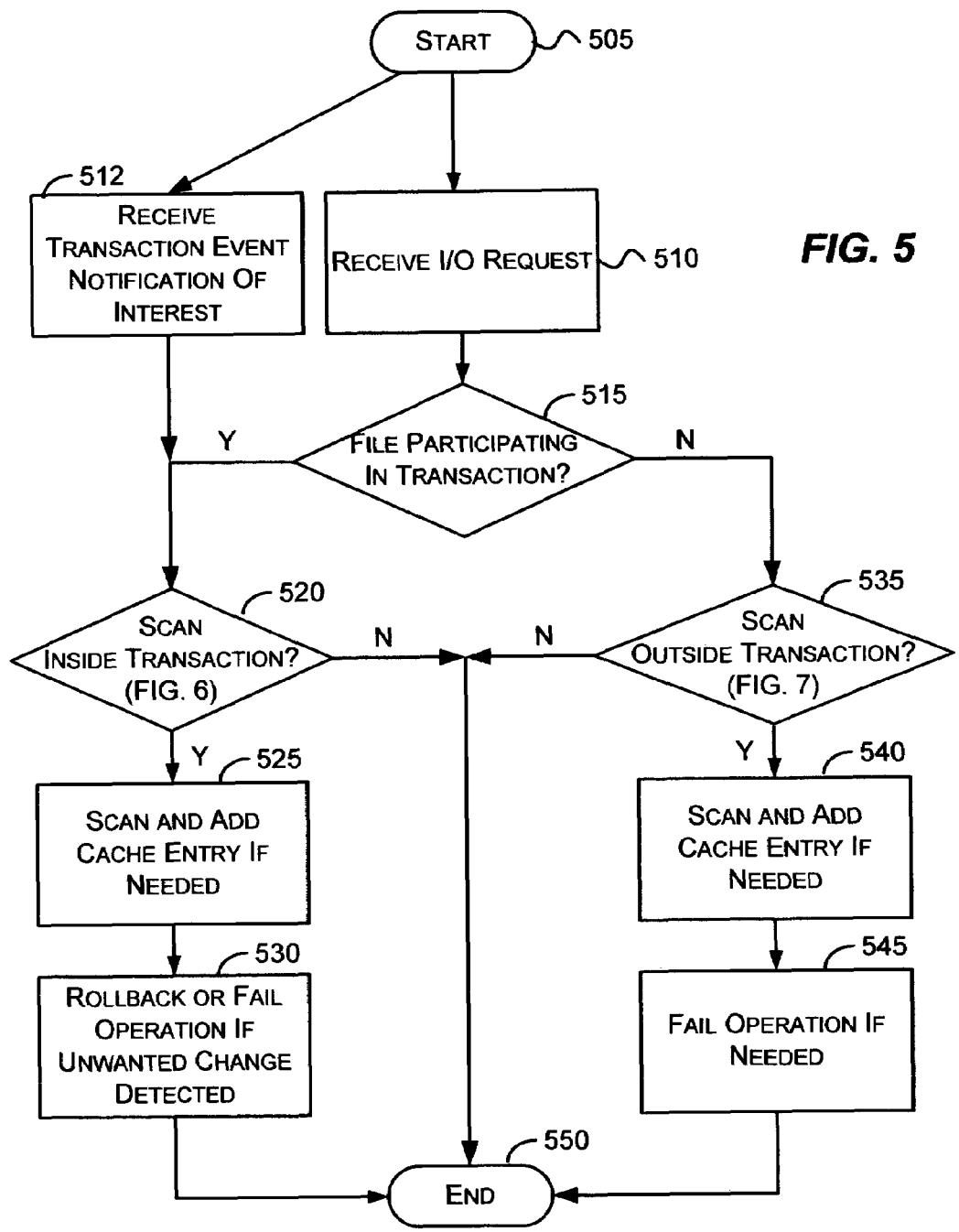
FIGS. 5-7 are flow diagrams that generally represent actions that may occur in guarding against unwanted file modification in accordance with aspects of the subject matter described herein.
Figure 6:
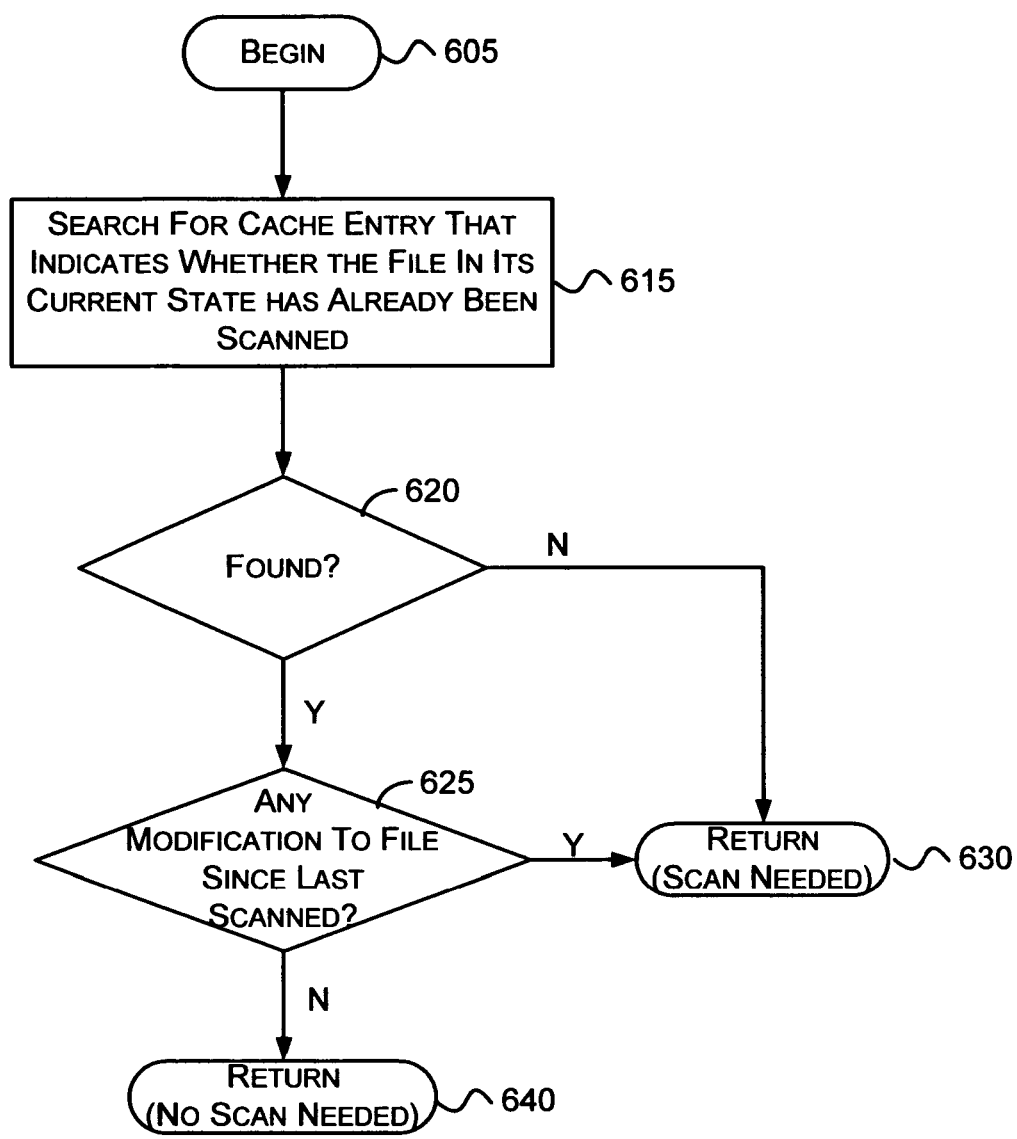
Figure 7:
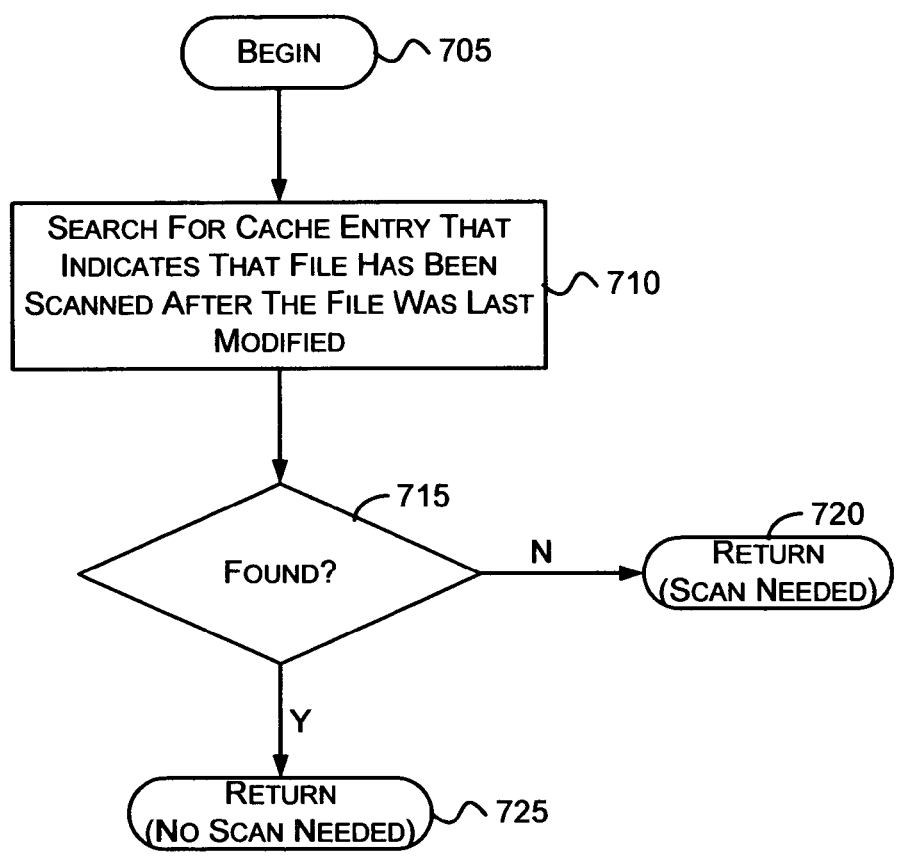

FIGS. 5-7 are flow diagrams that generally represent actions that may occur in guarding against unwanted file modification in accordance with aspects of the subject matter described herein. Turning to FIG. 5, at block 505, the actions begin.

After block 505, either an I/O request (e.g., file operation) is received (block 510) or a transaction event notification of interest is received (block 512). For example, an open operation or a prepare event notification is received by a filter.

A transaction event notification of interest comprises notification for any transaction event at which scanning may potentially be needed. For example, in one embodiment, scanning may potentially be needed during the prepare state of a transaction. In this embodiment, a transaction event notification of interest is received when the transaction enters the prepare state.

At block 515, a determination is made as to whether the file associated with the I/O request is participating in a transaction. If so, the actions continue at block 520; otherwise, the actions continue at block 535. Determining whether the file is participating in a transaction may be performed by checking a transaction ID in the Related_Objects object, for example.

Note that it is possible to have a file open both within a transaction and outside the transaction concurrently. In this case, whether the file is participating in a transaction depends on the I/O request. If the I/O request is associated with a transaction, then block 520 is reached; otherwise, block 535 is reached. If a file is open both within and outside a transaction concurrently, there may be a cache entry for the outside access and a set of cache entries for the transaction accesses. This may improve performance as a file in a transaction may be accessed repeatedly by processes outside the transaction.

At block 520, a determination is made as to whether to scan the file within the transaction as described in more detail in conjunction with FIG. 6. If it is determined that a scan is needed, the actions continue at block 525; otherwise, the actions continue at block 550. At block 525, the file is scanned using a handle associated with the transaction that allows the scanner to view the file together with any changes that have occurred during the transaction and a cache entry is added.

At block 530, the transaction is rolled back and/or the operation failed if an unwanted change (e.g., virus code) is detected.

At block 535, a determination is made as to whether to scan the file outside a transaction as described in more detail in conjunction with FIG. 7. If it is determined that a scan is needed at block 535, the actions continue at block 540; otherwise, the action continue at block 550. At block 540, the file is scanned using a handle outside a transaction and a cache entry added. At block 545, the operation is failed if an unwanted changed was detected in block 540.

At block 550, the actions end.

FIG. 6 is a flow diagram that generally represents actions corresponding to block 520 of FIG. 5 that may occur in determining whether to scan inside a transaction in accordance with aspects of the subject matter described herein. At block 605, the actions begin.

At block 615, a search is performed for a cache entry that indicates whether the file in its current state has already been scanned. In one embodiment, having a cache entry that indicates that the file in its current state has already been scanned comprises a cache entry that includes a transaction context equivalent to the transaction context of the file. In other words, the transaction context of the cache entry and the transaction context of the file have equivalent file object IDs, transaction IDs, and, if they exist in at least one of the transaction contexts, valid save point IDs and equivalent miniversions.

If the event that caused the search is an open operation and if the open operation is the first open operation of the file, having a cache entry that indicates that the file in its current state has already been scanned may comprises a cache entry with only an equivalent file ID. In one embodiment, any cache entry that exists before the transaction for any of the files within the transaction may be duplicated and a transaction ID corresponding to the transaction added when the transaction begins. This may be done to avoid having to track whether an open operation is the first or subsequent open operation in the transaction.

At block 620, if such a transaction context is found, the actions continue at block 625; otherwise, the actions continue at block 630.

At block 625, a determination is made as to whether any modifications have occurred to the file since it was last scanned. If so, the actions continue at block 630; otherwise, the actions continue at block 640. A cache entry may include a time stamp that indicates when the file it is associated with was last scanned. In addition, the file may be associated with metadata that indicates when the file was last modified. If the timestamp in the cache is before the time when the file was last modified, a modification may be detected.

In an alternative embodiment, when a write operation for a file is detected, its corresponding cache entry is deleted or invalidated. In this embodiment, the actions associated with block 625 may be skipped.

At block 630, the actions return indicating that a scan of the file is needed.

At block 640, the actions return indicating that a scan of the file is not needed.

FIG. 7 is a flow diagram that generally represents actions corresponding to block 535 of FIG. 5 that may occur in determining whether to scan a file outside a transaction in accordance with aspects of the subject matter described herein. At block 705, the actions begin.

At block 710, a search is performed for a cache entry that indicates whether the file has been scanned after the file was last modified. As mentioned previously, in one embodiment, a cache entry may be deleted or invalidated if a write operation occurs. Thus, in this embodiment, finding any cache entry may be sufficient to indicate that the file was scanned after it was last modified. In another embodiment, however, a timestamp of the cache entry may be compared with metadata associated with the file to detect whether the file was modified after the scan.

At block 715, if the cache entry was found, the actions continue at block 725; otherwise, the actions continue at block 720.

At block 720, the actions return indicating that a scan of the file is needed.

At block 725, the actions return indicating that a scan of the file is not needed.

Figure 8:
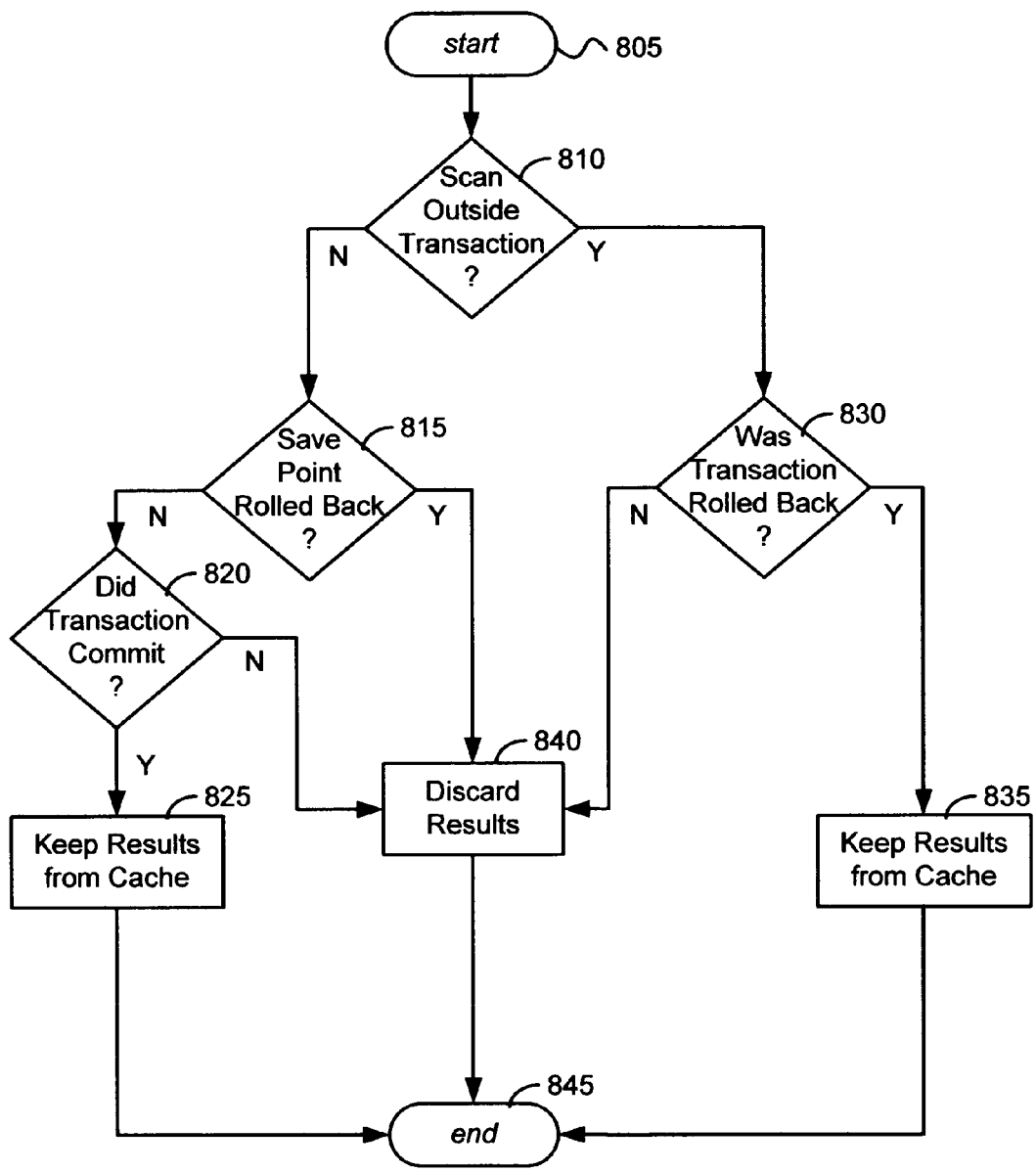
FIG. 8 is a flow diagram that generally represents whether a cache entry may be discarded or kept in accordance with aspects of the subject matter described herein.

FIG. 8 is a flow diagram that generally represents whether a cache entry may be discarded or kept in accordance with aspects of the subject matter described herein. At block 805, the actions begin.

At block 810, a determination is made as to whether the scan occurred outside a transaction. If so, the actions continue at block 830; otherwise, the actions continue at block 815.

At block 815, a determination is made as to whether a save point was rolled back. If so, the actions continue at block 840 at which point the cache entry associated with the save point (and all later save points) are discarded; otherwise, the actions continue at block 820.

At block 820, a determination is made as to whether a transaction committed. If so, the actions continue at block 825 where the cache entries are kept and may be modified to indicate that they apply to non-transaction related scans as well. In an embodiment in which a cache entry is discarded on a write operation, if a cache entry still exists at the end of a transaction, this may be an indication that the file has not been written to since last scanned. At block 825, any unneeded cache entries (e.g., miniversion and/or save point related to files within the transaction) may be discarded. If a transaction did not commit, the actions continue at block 840 at which all cache entries associated with the transaction may be discarded.

At block 830, a determination is made as to whether the transaction was rolled back. If so, any cache entries associated with files involved in the transaction that existed before the transaction started may be kept at block 835. Otherwise, cache entries associated with files involved in the transaction that existed before the transaction started may be discarded or updated if their associated files have cache entries created during the transaction. In one embodiment, the cache entries associated with files involved in the transaction that existed before the transaction started may simply be discarded if the transaction was not rolled back as this may affect performance but not correctness.

At block 845, the actions end.

It should be understood that the actions described in conjunction with FIGS. 5-8 are not all-inclusive of all the actions an antivirus filter may take in protecting against unwanted file modifications. Furthermore, although the actions are described as occurring in a particular order, in other embodiments, some of the actions may occur in parallel or may be performed in another order without departing from the spirit or scope of the subject matter described herein.

Although some implementations have been described above, it will be recognized that other implementations may also be used to achieve protection from unwanted file changes.

For example, in one embodiment, an antivirus filter may not track (e.g., in a cache) whether a file has been scanned before. Instead, each time before a file is opened, a scan may be performed to determine whether the file has a virus. If so, the open is failed and, if the file is in a transaction, the transaction may be rolled back. It will be recognized, however, that while this embodiment is relatively straightforward to implement, it may cause performance degradation in file systems in which a file is repetitively opened.

In another embodiment, the cache entries for each file involved in a transaction are discarded at the beginning of the transaction and each file involved in the transaction is scanned each time it is opened and in the prepare stage. If the scanning engine detects that a file contains a virus, the transaction is rolled back.

In another embodiment, the cache entries for each file involved in a transaction are discarded after the transaction commits but not if the transaction rolls back. This may cause these files to be scanned when they are subsequently opened, thus catching any virus.

In another embodiment, each file that is involved in a transaction is scanned immediately after a transaction commits or at least before the file is allowed to be opened subsequent to the transaction. If a file is infected it may be quarantined and its cache entry, if any, invalidated. If a file is not infected, its cache entry may remain intact or a new cache entry may be added if needed.

While some points at which scanning may be performed have been described, in other embodiments, scans may be performed during one or more file operations including open, create, close, and cleanup, and/or one or more transaction state changes including pre-prepare, prepare, commit, and rollback.

Although aspects of the subject matter described herein have been described in conjunction with a managed filter, in other embodiments, a stacked filter may perform the needed functions of the filter manager and managed filter to obtain the same results. Thus, aspects of the subject matter described herein should not limited to either stacked filters or managed filters as both may be implemented to perform functions and actions described herein.

As can be seen from the foregoing detailed description, aspects have been described related to antivirus protection and transactions. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium having computer-executable instructions for executing in an environment supporting file system transactions, comprising:

detecting that a file is participating within transaction, wherein the transaction is atomic, consistent, and isolated;

upon detecting that the file is participating within the transaction, searching a cache for a cache entry that has a transaction context that is equivalent to the transaction context of the file wherein the cache entry indicates that the file was previously scanned for unwanted modifications;

upon locating a cache entry having an equivalent transaction context, accessing a time stamp and metadata within the cache entry, wherein the time stamp indicates when the last scan of the file occurred, and wherein the metadata indicates when the file was last modified;

determining from the time stamp and the metadata of the cache entry that the file was modified by the transaction subsequent to the last scan;

upon determining that the file was modified subsequent to the last scan, scanning the modified file within the transaction to detect whether the file contains an unwanted modification that was made within the transaction to the file; and upon detecting that the file contains no unwanted modification, modifying the cache entry to indicate that the file contains no unwanted modification such that a subsequent request to open the file may be performed without scanning the file for unwanted modifications.

2. The computer storage medium of claim 1, wherein detecting that the file is participating in transaction is performed by a filter that is given an opportunity to examine operations between an application and a file system hosting the file.

3. The computer storage medium of claim 1, wherein scanning the modified file comprises obtaining a handle used by a process to open the file in the transaction.

4. The computer storage medium of claim 1, wherein scanning the file occurs at a prepare state of the transaction.

5. The computer storage medium of claim 4, wherein the prepare state comprises a state before the transaction is committed and after no more changes are allowed to occur to the file during the transaction.

6. The computer storage medium of claim 4, further comprising upon detecting that the file contains an unwanted modification, rolling back the transaction.

7. The computer storage medium of claim 1, wherein an unwanted modification comprises a computer virus.

8. A method for detecting unwanted modifications in files of a computing system, the method comprising:
    detecting that a file is participating within transaction, wherein the transaction is atomic, consistent, and isolated;
    upon detecting that the file is participating within the transaction, searching a cache for a cache entry that has a transaction context that is equivalent to the transaction context of the file wherein the cache entry indicates that the file was previously scanned for unwanted modifications, and wherein the cache is stored on a computer storage medium of the computing system;
    upon locating a cache entry having an equivalent transaction context, accessing a time stamp and metadata within the cache entry, wherein the time stamp indicates when the last scan of the file occurred, and wherein the metadata indicates when the file was last modified;
    determining from the time stamp and the metadata of the cache entry that the file was modified by the transaction subsequent to the last scan;
    upon determining that the file was modified subsequent to the last scan, scanning the modified file within the transaction to detect whether the file contains an unwanted modification that was made within the transaction to the file; and
    upon detecting that the file contains no unwanted modification, modifying the cache entry to indicate that the file contains no unwanted modification such that a subsequent request to open the file may be performed without scanning the file for unwanted modifications.

9. The method of claim 8, wherein both transaction contexts are equivalent when the transaction contexts include equivalent file object IDs associated with the file, transaction IDs associated with the transaction, and, if a save point and miniversion exist in at least one of the transaction contexts, equivalent save point IDs and miniversions.

10. The method of claim 9, further comprising:
    upon committing the transaction, setting the transaction ID of the transaction context to null such that the cache entry is valid outside of the transaction such that when a subsequent request to open the file outside of the transaction occurs, the file is opened without scanning the file for unwanted modifications.

11. The method of claim 10, further comprising:
    deleting or invalidating the cache entry when a write operation to the file is detected.

12. In a computing environment, an apparatus, comprising:
    a processor; and
    system memory in communication with the processor, the system memory storing the following:
        a scanner arranged to scan files at least inside transaction and to detect unwanted modifications, wherein a transaction is atomic, consistent, and isolated;
        a cache arranged to store results obtained by the scanner in cache entries; and
        a filter arranged to examine operations directed to a file system supporting transactions and to allow or deny the operations based on data supplied by the scanner;
        wherein the filter, upon detecting that a file is participating in the transaction performs the following:
            searches a cache for a cache entry that has a transaction context that is equivalent to the transaction context of the file wherein the cache entry indicates that the file was previously scanned for unwanted modifications;
            upon locating a cache entry having an equivalent transaction context, accesses a time stamp and metadata within the cache entry, wherein the time stamp indicates when the last scan of the file occurred, and wherein the metadata indicates when the file was last modified;
            determining from the time stamp and the metadata of the cache entry that the file was modified by the transaction subsequent to the last scan;
            upon determining that the cache entry indicates that the file has been modified by the transaction subsequent to the last scan, instructs the scanner to scan the file within the transaction to detect unwanted modifications that were made within the transaction to the file; and
            upon receiving notification from the scanner that the file contains no unwanted modification, modifies the cache entry to indicate that the file contains no unwanted modification such that a subsequent request to open the file may be performed without scanning the file for unwanted modifications.

13. The apparatus of claim 12, wherein the filter is further arranged to discard cache entries that do not pertain to the files.

14. The apparatus of claim 13, wherein a cache entry does not pertain to a file if the cache entry was created before the file entered transaction that subsequently commits.

15. The apparatus of claim 13, wherein a cache entry does not pertain to a file if the cache entry was created during transaction that completes and if the cache entry is associated with a save point identifier or a miniversion.

16. The apparatus of claim 12, wherein the cache is further arranged to invalidate cache entries that do not pertain to the files.

17. The computer storage medium of claim 5, wherein the transaction context of the cache entry includes a transaction ID that matches the transaction ID of the file, and further comprising:
    upon committing the transaction, setting the transaction ID of the transaction context to null such that the cache entry is valid outside of the transaction such that when a subsequent request to open the file outside of the transaction occurs, the file is opened without scanning the file for unwanted modifications.

* * * * *